United States Patent Office 3,286,958
Patented Nov. 22, 1966

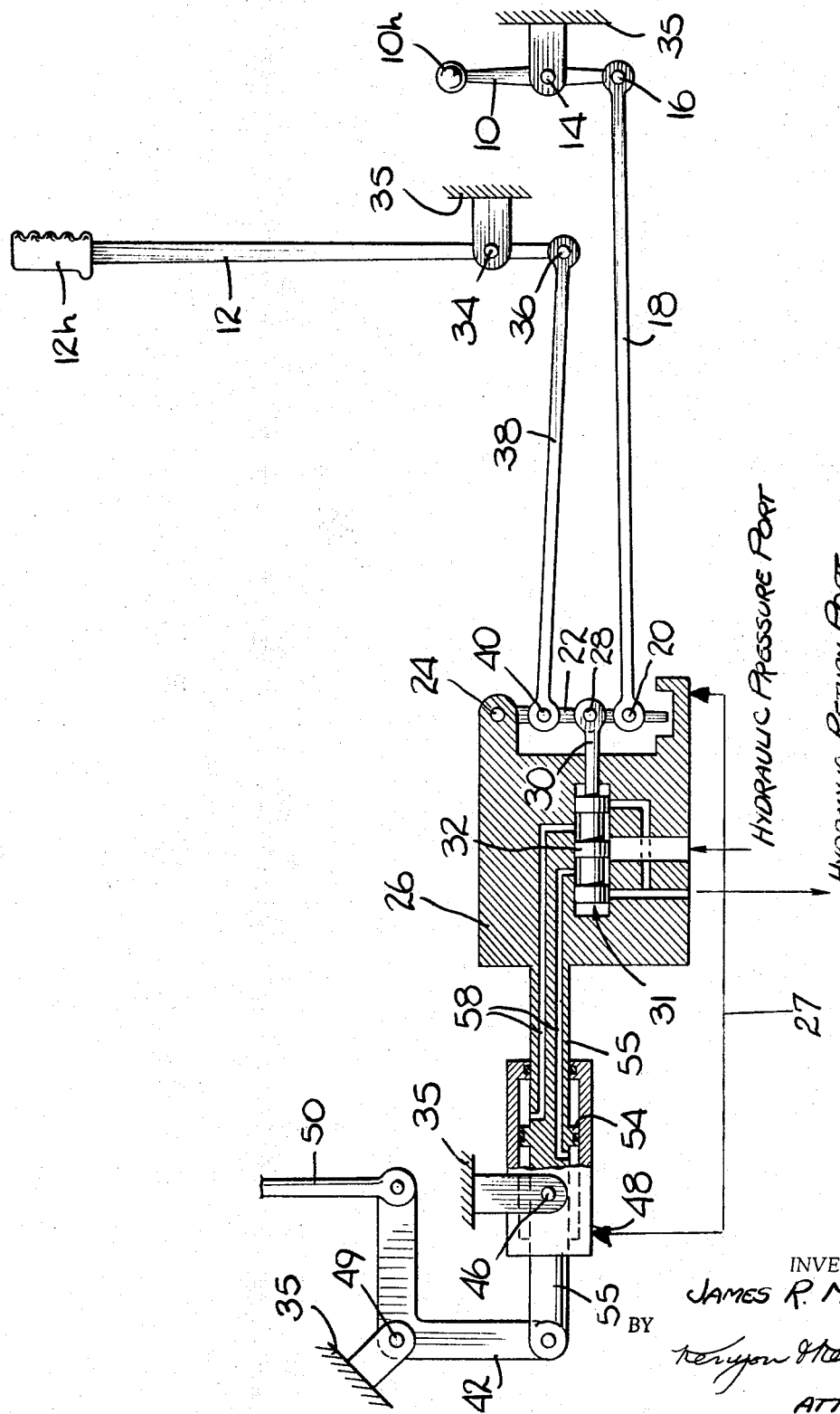

3,286,958
CO-PILOT NAVIGATION CONTROL
James R. Moran, Fort Worth, Tex., assignor to Bell Aerospace Corporation, Wheatfield, N.Y., a corporation of Delaware
Filed May 18, 1965, Ser. No. 456,627
6 Claims. (Cl. 244—84)

This invention relates in general to aircraft navigation and more particularly to the linkage between the piloting control sticks and the hydraulic boost amplifier which is controlled by the piloting control sticks.

Where both pilot and co-pilot have substantially identical cyclic pitch control sticks linked to the same hydraulic boost amplifier, if the pilot exerts a pound of force in one direction and the co-pilot exerts an equal force in a direction 180° different from the pilot's direction of force, these two forces will cancel each other out. The pilot and co-pilot, because they have the same type of control stick, have the same mechanical advantage over one and the same control valve of a hydraulic amplifier.

In configurations where the co-pilot primarily functions as a gunner, he may be placed forward and below the pilot in a portion of the fuselage with limited available space. Space is limited in part because of the requirement for other equipment such as guns or sights. As a result of the space limitations, the control stick which the co-pilot has available to him may necessarily be very much foreshortened. In some cases where the co-pilot's control stick is foreshortened, compensation is provided in the form of intervening electrical or hydraulic amplifying means to provide equivalent force capabilities (equal authority) for both pilots. However, where the configuration lacks such intervening means and there is a common connection of some sort from both control sticks to a hydraulic boost amplifier, then the problem arises of unequal pilot and co-pilot authority to which this invention is directed.

Where the co-pilot's control stick is for example one-fifth the length of the pilot's control stick, the co-pilot has to exert five times as much force at the end of his control stick as does the pilot in order to match the pilot's control. Normally, this affords no serious problem since the pilot is in control of the ship and there is no need for the co-pilot to act in a fashion opposing the commands from the pilot. However, there are situations, particularly in combat, where the co-pilot may have to overcome a force on the pilot's control stick. Most dramatically, a serious problem arises where the pilot has been shot and slumps over his control stick so that the weight of the pilot is on the pilot's control stick and causes the aircraft to go out of control. In this situation, the co-pilot must be able to immediately override the force of the pilot's control stick. The co-pilot is in no position to get to the pilot and remove the force on the pilot's control stick in time to prevent catastrophe for the aircraft.

With a full-sized control stick, the co-pilot would have difficulty enough in overcoming the weight of the pilot. In those circumstances where his control stick is foreshortened appreciably, the force required at the co-pilot's stick in order to overcome the weight of the pilot on the much longer pilot's stick is frequently more than the co-pilot can bring to bear.

Accordingly, it is the major purpose of this invention to provide a co-pilot who must use a foreshortened control stick with an ability to control navigation equal to that provided the pilot.

It is a related purpose of this invention to provide a means whereby a given force at the top of the co-pilot's foreshortened control stick will have the same effect on the navigational system as an equal force on top of the pilot's longer control stick.

It is a further purpose of this invention to provide equal authority for the co-pilot and pilot by a simple mechanical system which is as reliable in operation as the linkage system presently employed in aircraft where the pilot and co-pilot have equal size control sticks.

It is a related purpose of this invention to avoid the weight, complexity and loss of reliability that would be entailed if additional electrical or ancillary hydraulic amplifying techniques were employed to compensate for the co-pilot's loss of mechanical advantage.

It is a further important purpose of this invention to provide the co-pilot and pilot equal authority without any change in the basic control stick motions or other operating characteristics so that the pilot and co-pilot will obtain navigational responses to their control stick movements of a nature with which they are already familiar.

Further objects and purposes of this invention will become apparent from the following detailed description and drawing in which the one figure presented is a mechanical schematic illustration of the device of this invention.

The embodiment shown in the figure illustrates a co-pilot's control stick 10 which is approximately one-fifth the length of the pilot's control stick 12. Specifically, the distance from pivot point 14 to the handle 10h is one-fifth the distance from pivot point 34 to the mid-point of the handle 12h. The lengths of the lower parts of the control sticks, from 34 to 36 and from 14 to 16 respectively, are equal. The co-pilot's control stick 10 pivots about fixed point 14 with its lower end pivotally connected at point 16 to the connecting rod 18. The connecting rod 18 in turn is pivotally connected at point 20 to a valve control link 22. One end of the valve control link 22 is pivotally connected at point 24 to the frame 26 of the hydraulic boost amplifier 27. The link 22 is also pivotally connected at a central point 28 to the spool 30 of the control valve 31 of the amplifier 27. Thus, a motion by the co-pilot which moves the stick 10 to the left (as seen in the figure) will move the point 16 and thus the rod 18 to the right. This movement of the rod 18 to the right will cause the link 22 to pivot counter-clockwise about the point 24 thereby moving the valve spool 30 to the right.

The pilot's stick 12 operates in the same fashion and is pivoted at fixed point 34 to the fuselage 35 so that movement to the left (as seen in the figure) of the control stick 12 by the pilot results in movement to the right of the lower end of the stick 12. The lower end of the stick 12 is connected at point 36 to the connecting rod 38, which connecting rod in turn is pivotally connected at point 40 to the valve control link 22. Thus a movement to the right at the bottom of the pilot stick 12 is translated by the connecting rod 38 to the point 40 causing the valve control link 22 to rotate counter-clockwise about the point 24 thereby moving the valve spool 30 to the right. In this fashion, corresponding movements of the pilot and co-pilot have corresponding effects on the valve spol 30 in that a movement to the left of the top of either the pilot's control stick 12 or the co-pilot's control stick 10 will result in a movement in the same direction (to the right) of the valve spool 30.

The hydraulic boost amplifier 27 includes a cylinder 48 within which a piston head 54 is positioned for reciprocal motion. Piston head 54 and piston rod 55 are an integral part of the frame 26 of the boost amplifier 27. The piston rod 55 extends through both ends of the cylinder 48, one end being made integral with the amplifier frame 26 and the other end being pivotally connected to a rocker arm 42, which arm 42 is in turn pivoted at fixed point 49 to the fuselage 35. The cylinder 48 is also pivotally connected at fixed point 46 to the fuselage 35 so that the cylinder 48 is not free to move laterally. Hydraulic lines 58 lead to the chamber within the cylinder 48 at either side of the piston head 54 and thus connect the interior of the cylinder 48 to the valve 31 chamber of the boost amplifier 27.

With the above structure in mind, and with reference to the figure, it may be seen that movement of the control stick 10 or 12 moves the spool 30 and thus moves the valve 31 within its chamber. Movement of the valve 31 blocks the flow of hydraulic fluid under pressure into one or the other of the hydraulic lines 58 depending upon the direction of movement of the spool 30 and valve 31.

As may be seen from the valve arrangement in the figure, when the control link 22 has the rotational position shown, the spool 30 will be in such a position that fluid from the hydraulic pressure port will be supplied through both of the hydraulic lines 58 to the chambers (within the cylinder) on both sides of the piston head 54. Under this condition, there will be equal pressure on both sides of the piston head 54 and thus no movement in the linkage system of which the piston rod 55 forms a part. A movement of the control stick 10 or 12 will move the spool 30 relative to the valve 31 chamber thereby placing the central valve head 32 in such a position as to block fluid flow from the hydraulic pressure port into one of the two hydraulic lines 58. Unbalanced pressure will then obtain on one side of the piston head 54 in the cylinder 48 causing the piston rod 55 to move either to the right or left. Movement of the rod 55 causes the rocker arm 42 to rotate about its pivotal connection to the bracket 36 and consequently the rod 50 moves to actuate the remainder of the control system to which the rod 50 is connected. At the same time movement of the piston rod 55 will cause the entire frame 26 of the boost amplifier 27 to move relative to the spool 30 thus re-establishing the positional relationship between the valve 31 chamber and the spool 30 that is illustrated; a positional relationship which results in equal pressure on both sides of the piston head 54, under which situation the piston rod 55 ceases to move. The above described boost amplifier 27 is a type whose structure and operation is known in this art so that further and more detailed description is not herein necessary.

As previously stated, it is desired that a force applied by the co-pilot to his control stick 10h be capable of at least resisting or preferably overcoming the inadvertent application of a force or weight (of the type previously noted) to the pilot's control stick 12. Stated another way, equal forces applied at the top of each control stick 10 and 12 should cause approximately equal moments to be applied to link 22 around pivot 24 and, hence, should apply approximately equal forces to spool 30. Accordingly, the distances from the pivot point 24 on the frame 26 to the connecting points 40 and 20 are inversely proportional to the length of the respective control sticks 12 and 10. As stated above, the length of the control sticks 12 and 10 are calculated from the pivot points 34, 14 to the approximate mid-points of handles 12h and 10h, respectively. In addition, the bottom sections of the control sticks, 34 to 36 and 14 to 16, are of equal length. Specifically, if the length of the pilot's control stick 12 is five times the length of the co-pilot's control stick 10, then the distance from the point 40 to the pivot point 24 is made one-fifth the distance from the point 20 to the pivot point 24. With these relationships it is clear that a force applied to the top of one stick can be resisted by an equal force at the top of the other stick.

However, as the lengths of the bottom portions of the two control sticks are equal and the length from 24 to 40 (for the pilot's stick) and 24 to 20 (for the co-pilot's stick) are in the ratio of five to one it would at first glance appear that the respective angles transcribed by the two sticks for a given motion of the valve spool 30 would be unequal; that is the co-pilot's stick 10 would transcribe an angle five times that of the angle transcribed by the pilot's stick 12. This would, of course, be unacceptable as a total angle of movement for the pilot's stick of say 40° would then require 200° angular movement for the co-pilot's stick. However, such is not the case, the angles of stick motion being the same for any spool motion. This can be best understood when it is appreciated that the essential nature of the movement of points 40, 28 and 20 (in fact any point on the control link 22) is linear rather than rotational as it might appear to be. While movement of either control stick will initially cause link 22 to rotate around point 24, such rotation is minute and limited to that amount necessary to cause the spool 30 to move relative to the frame 26 of hydraulic boost 27 so as to unbalance the valve 31 permitting pressurized hydraulic fluid to flow into only one chamber of the boost cylinder 48. This causes the boost frame 26 to then move relative to the spool 30 re-establishing the original positional relationship between link 22 and the frame 26.

With an understanding of the spatial or kinematic functioning of the linkages, it becomes possible to comprehend the manner in which this invention readily serves its most important purpose. That most important purpose is to give the co-pilot force equalization with the pilot so that one pound of force by the co-pilot will have exactly the same effect on the valve control link 22 as does one pound of force by the pilot.

It should be remembered that no particular force problem arises solely from the fact of the foreshortened co-pilot's control stick 10 during normal operation where the co-pilot merely has to move the link 22 and the spool 30 since the valve spool 30 offers negligible resistance. The problem arises only when the co-pilot is required to overcome an undesired force on the pilot's control stick 12 or in the event that the hydraulic boost system should fail and the co-pilot might be obliged to operate the aircraft through a mechanical control system unaided by hydraulic power. It is to that problem which this invention is primarily directed.

Nevertheless, it should be appreciated that an advantage of this invention during normal operation lies in the fact that the co-pilot achieves the same response from the angular movement of his control stick 10 as does the pilot. Thus the co-pilot's experience in flying the aircraft's ordinary size control stick 12 can be essentially carried over to the foreshortened control stick 10.

This invention has been described in connection with a simple embodiment in which there is but one connecting rod (18 or 38) between each pilot's control stick and the hydraulic boost amplifier 27. Depending upon the design of the aircraft, it may be necessary to have more than one connecting rod and other types of links between the control sticks and the boost amplifier controlled by these control sticks. It shall be understood that the term connecting rod in this application and in the claims is used to cover all such more complex connecting linkages; which more complex connecting linkages are a mechanical equivalent to a single connecting rod in the context of this invention. One reason for using more than a single connecting rod might be that the geometry of the aircraft requires positioning the hydraulic boost amplifier 27 at a place where one rod could not be used to connect the bottom of the control sticks to the valve control link 22.

Although the above application has been described in connection with a control mechanism that includes a hydraulic boost amplifier, it should be evident that the invention may be equally well employed in helicopters and other aircraft where a hydraulic boost is not employed between the control stick and the aerodynamic member which is ultimately controlled by movement of the control stick.

These and other obvious variations in the embodiment described shall be understood to be included within the scope of the following claims.

What is claimed is:
1. In an aircraft having a co-pilot's navigating control stick foreshortened relative to the pilot's navigating control stick whereby said pilot's control stick provides a mechanical advantage over said co-pilot's control stick, said aircraft including a valve controlled hydraulic boost amplifier in a navigation control system between said control sticks and a control surface, the improvement comprising:
   first linkage means between said pilot's control stick and said valve, and
   second linkage means between said co-pilot's control stick and said valve,
   said second linkage means providing a mechanical advantage over said first linkage means whereby said respective control sticks obtain an equal navigational response from an equal angular movement.

2. In an aircraft having a co-pilot's navigating control stick foreshortened relative to the pilot's navigating control stick whereby said pilot's control stick provides a mechanical advantage N over said co-pilot's control stick, said aircraft including a valve controlled hydraulic boost amplifier in the navigation control system between said control sticks and a control surface, the improvement comprising:
   first linkage means between said pilot's control stick and said valve, and
   second linkage means between said co-pilot's control stick and said valve,
   said second linkage means providing a mechanical advantage N over said first linkage means whereby said respective control sticks obtain an equal navigational response from an equal angular movement.

3. In an aircraft navigation system having a co-pilot's control stick foreshortened relative to the pilot's control stick, said control sticks being linked to a valve control link of a hydraulic boost amplifier, said valve control link being pivoted at a first end to the frame of the hydraulic amplifier, the improvement comprising:
   a first connecting rod between said pilot's control stick and said control valve link, said first connecting rod being connected to said control valve link at a first distance from the point at which said valve control link is pivoted to said amplifier frame, and
   a second connecting rod between said co-pilot's control stick and said control valve link, said second connecting rod being connected to said control valve link at a second distance from said point at which said valve control link is pivoted to said amplifier frame,
   said second distance being greater than said first distance, whereby a mechanical advantage is provided to the co-pilot in a direction tending to overcome the mechanical advantage provided to the pilot by the control sticks.

4. In an aircraft navigation system having a co-pilot's control stick foreshortened relative to the pilot's control stick, said control sticks being linked to a valve control link of a hydraulic boost amplifier, said valve control link being pivoted at a first end to the frame of the hydraulic amplifier, the improvement comprising:
   a first connecting rod between said pilot's control stick and said control valve link, said first connecting rod being connected to said control valve link at a first distance from the point at which said valve control link is pivoted to said amplifier frame, and
   a second connecting rod between said co-pilot's control stick and said control valve link, said second connecting rod being connected to said control valve link at a second distance from said point at which said valve control link is pivoted to said amplifier frame,
   the ratio between said second distance and said first distance being substantially equal to the ratio of the length of said pilot's control stick to the length of said co-pilot's control stick whereby said respective control sticks provide equal authority to obtain an equal navigational response from an equal angular movement.

5. In an aircraft navigation system having a co-pilot's control stick foreshortened relative to the pilot's control stick, said control sticks being linked to a valve control link of a hydraulic boost amplifier, said valve control link being pivoted at a first end to the frame of the hydraulic amplifier, the improvement comprising:
   a first connecting rod having a first end pivotally connected to the bottom end of said pilot's control stick and having a second end pivotally connected to a first position on said control valve link,
   a second connecting rod having a first end pivotally connected to the bottom end of said co-pilot's control stick and a second end pivotally connected to a second position on said control valve link,
   the distance between said first end of said valve control link and said first position on said valve control link being substantially less than the distance between said first end of said valve control link and said second position on said valve control link whereby said respective control sticks provide equal authority to obtain an equal navigational response from an equal angular movement.

6. In an aircraft navigation system having a co-pilot's control stick foreshortened relative to the pilot's control stick, each of said control sticks being pivotally mounted to the fuselage of the aircraft, each of said control sticks having a lower end extending below the point at which said control sticks are pivoted to said fuselage, each of said control sticks being linked to a valve control link whose position controls the control valve of a hydraulic boost amplifier, said valve control link being pivoted at a first end to the frame of the hydraulic amplifier, the improvement comprising:
   a first connecting rod having a first end pivotally connected to the lower end of said pilot's control stick and a second end pivotally connected to said control valve link at a first distance from said first end of said valve control link, and
   a second connecting rod having a first end pivotally connected to the lower end of said co-pilot's control stick and a second end pivotally connected to said control valve link at a second distance from said first end of said control valve link,
   the ratio between said second distance and said first distance being substantially equal to the ratio of the length of said pilot's control stick above the point at which said pilot's control stick is pivoted to said fuselage to the length of said co-pilot's control stick above the point at which said co-pilot's control stick is pivoted to said fuselage.

References Cited by the Examiner
UNITED STATES PATENTS 1,315,759  9/1919  Caudron _____ 244—84
2,472,653  6/1949  Eaton _____ 244—85

FERGUS S. MIDDLETON, *Primary Examiner.*

ANDREW H. FARRELL, *Examiner.*